(12) United States Patent
Nair et al.

(10) Patent No.: US 10,015,050 B2
(45) Date of Patent: Jul. 3, 2018

(54) DISTRIBUTED COMPUTING SYSTEM

(71) Applicant: Bank of America Corporation, Charlotte, NC (US)

(72) Inventors: Suresh G. Nair, Robbinsville, NJ (US); Howard Boville, New York City, NY (US); Antony R. Kerrison, Mount Arlington, NJ (US); Robert J. Maloney, Iron Station, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/798,548

(22) Filed: Oct. 31, 2017

(65) Prior Publication Data

US 2018/0069758 A1  Mar. 8, 2018

Related U.S. Application Data

(62) Division of application No. 14/558,317, filed on Dec. 2, 2014, now Pat. No. 9,843,483.
(Continued)

(51) Int. Cl.
*G06F 9/44* (2018.01)
*G06F 15/177* (2006.01)
(Continued)

(52) U.S. Cl.
CPC ......... *H04L 41/0886* (2013.01); *G06Q 10/10* (2013.01); *H04L 29/06843* (2013.01);
(Continued)

(58) Field of Classification Search
CPC .............. H04L 29/06823–29/0685; H04L 41/0876–41/0893; H04L 67/10
See application file for complete search history.

(56) References Cited

U.S. PATENT DOCUMENTS 9,075,959 B2   7/2015   Chouinard et al.
9,098,364 B2   8/2015   Davis
(Continued)

OTHER PUBLICATIONS

Park, et al., "Platform-Aware Dynamic Configuration Support for Efficient Text Processing on Heterogeneous System," Mar. 2015, 6 pages.
(Continued)

*Primary Examiner* — Brendan Higa
(74) *Attorney, Agent, or Firm* — Banner & Witcoff, Ltd.; Michael A. Springs

(57) ABSTRACT

Aspects of the present disclosure are directed toward a distributed computing system in which host computing devices host computing services that are only accessible by client computing devices and other computing services associated with a particular computing channel for a line-of-business and in which host computing devices host computing services that are accessible by client computing devices and other computing services across lines of business. The computing services are configured according to a common application interface (API) that provides a modular configuration allowing the computing services to be deployed across multiple computing channels for multiple lines-of-business respectively. Aspects of the present disclosure are also directed toward an automated deployment system that is configured to automatically deploy computing services at a computing platform based on a computing platform template and one or more computing service templates.

20 Claims, 20 Drawing Sheets

Related U.S. Application Data

(60) Provisional application No. 62/052,185, filed on Sep. 18, 2014.

(51) Int. Cl.
    *H04L 12/24*     (2006.01)
    *H04L 29/08*     (2006.01)
    *G06Q 10/10*     (2012.01)
    *H04L 29/06*     (2006.01)

(52) U.S. Cl.
    CPC .......... *H04L 41/0806* (2013.01); *H04L 67/10* (2013.01); *H04L 67/125* (2013.01)

(56) References Cited

U.S. PATENT DOCUMENTS

| | | | |
|---|---|---|---|
| 9,632,770 B2 | 4/2017 | Harrison et al. | |
| 9,710,365 B2 | 7/2017 | Correll | |
| 9,740,473 B2 | 8/2017 | Kumar et al. | |
| 2002/0178262 A1* | 11/2002 | Bonnell | G06F 9/5083 709/225 |
| 2009/0248586 A1* | 10/2009 | Kaisermayr | G06Q 30/0283 705/80 |
| 2011/0231832 A1 | 9/2011 | Dorn et al. | |
| 2012/0272204 A1 | 10/2012 | Olewski et al. | |
| 2013/0030962 A1* | 1/2013 | Erle | G06Q 10/06 705/30 |
| 2013/0174124 A1 | 7/2013 | Watters et al. | |
| 2014/0035945 A1 | 2/2014 | Anglin et al. | |
| 2014/0372985 A1 | 12/2014 | Levin et al. | |
| 2015/0074659 A1* | 3/2015 | Madsen | G06F 8/61 717/177 |
| 2015/0180734 A1* | 6/2015 | Maes | G06F 9/5072 709/226 |
| 2015/0244597 A1* | 8/2015 | Maes | G06Q 10/10 715/736 |
| 2015/0296030 A1* | 10/2015 | Maes | G06F 9/5072 715/736 |
| 2017/0026488 A1 | 1/2017 | Hao et al. | |

OTHER PUBLICATIONS

Galluppi et al., "A Hierachical Configuration System for a Massively Parallel Neural Hardware Platform," May 2012, 10 pages.

Elmangoush et al., "Towards Standard M2M APIs for Cloud-Based Telco Service Platforms," Dec. 2013, 8 pages.

* cited by examiner

DISTRIBUTED COMPUTING SYSTEM

CROSS-REFERENCE TO RELATED APPLICATION

The present application is a divisional of U.S. patent application Ser. No. 14/558,317 entitled "DISTRIBUTED COMPUTING SYSTEM" and filed on Dec. 2, 2014, which claims priority to U.S. Provisional Patent Application No. 62/052,185 entitled "Business Platform as a Service" and filed on Sep. 18, 2014, each of which is incorporated by reference herein in its entirety.

BACKGROUND

An organization may be divided into multiple independent lines of business which may be referred to as business channels. A business channel is a way in which a line of business makes it business capabilities available to its customers in a holistic manner. For example, a banking organization may include a first business channel for banking services (e.g., ATM, tellers, etc.), a second business channel for financial advisory services (e.g., planning, insurance, investment, annuity, etc.), and a third business channel for technology infrastructure.

In this example, the technology infrastructure business channel may support each of the other business channels in the banking organization by providing back-end software and hardware. In addition, individual business channels may develop their own front-end components to facilitate the particular activities associated with that line of business. Individual business channels may, however, utilize disparate design standards and methodologies when developing such components. As a result, the front-end components developed by individual business channels may not be compatible with the back-end components of the technology infrastructure (i.e., front-end/back-end incompatibility). Furthermore front-end components developed by one business channel may not be compatible with front-end components developed by other business channels (i.e., cross-channel incompatibility). Cross-channel incompatibility may prevent deployment of useful components deployed by one business channel to other business channels, resulting in redundant efforts to develop components with similar functionality that are compatible at other business channels.

Therefore a need exists for a new approach to technology infrastructure in enterprise-wide computing systems is needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the present disclosure are directed toward a distributed computing system in which host computing devices host computing services that are only accessible by client computing devices and other computing services associated with a particular computing channel for a line-of-business and in which host computing devices host computing services that are accessible by client computing devices and other computing services across lines of business. The computing services are configured according to a common application interface (API) that provides a modular configuration allowing the computing services to be deployed across multiple computing channels for multiple lines-of-business respectively.

Aspects of the present disclosure are also directed toward an automated deployment system that is configured to automatically deploy computing services at a computing platform based on a computing platform template and one or more computing service templates.

Additional aspects of the present disclosure will be apparent in view of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Figure 1:
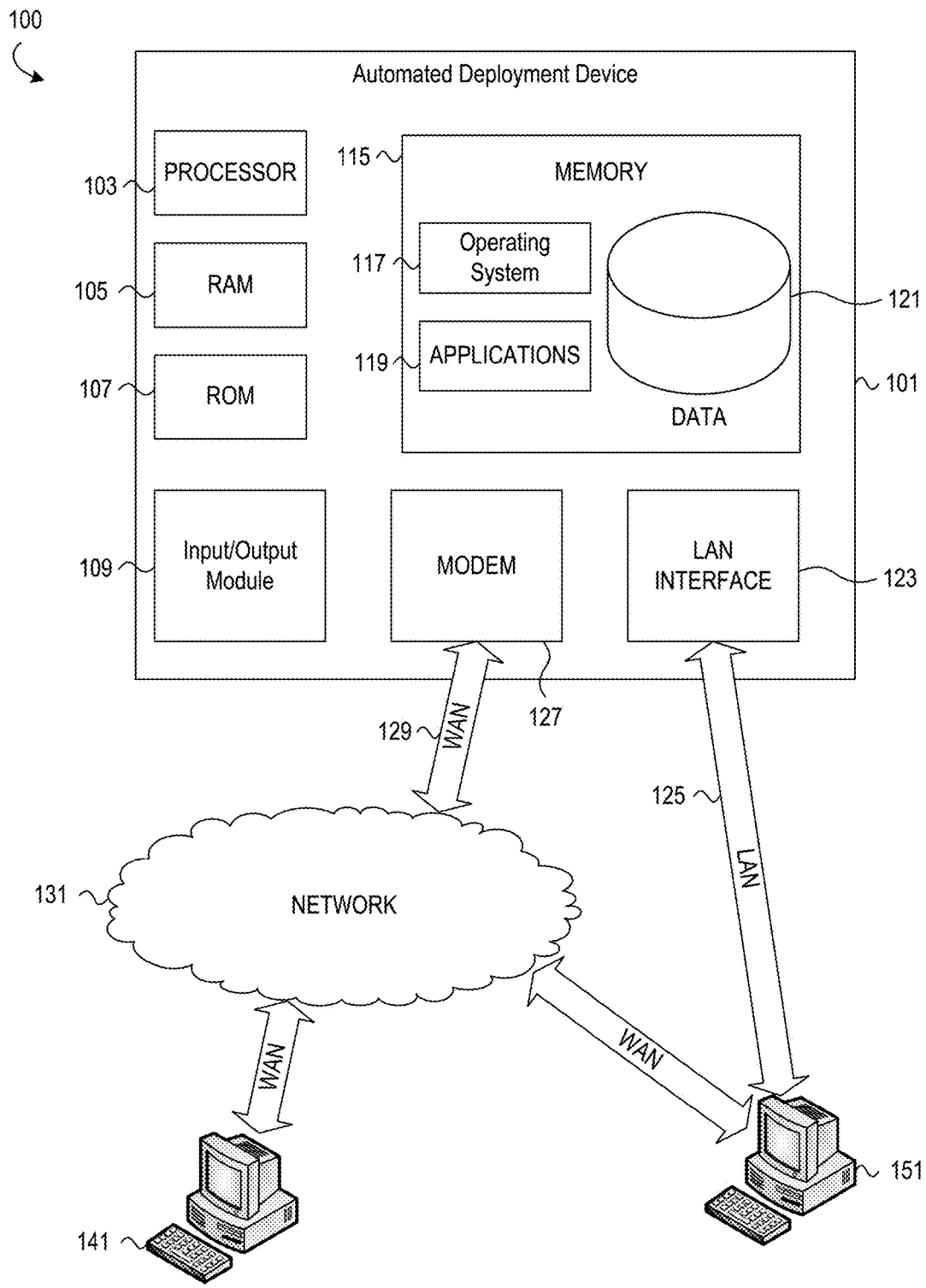
FIG. 1 is a block diagram of an example operating environment in which various aspects of the disclosure may be implemented.

Aspects of the present disclosure are directed toward a distributed computing system of an enterprise-wide computing system where the distributed computing system has an advantageous configuration and arrangement of its technology infrastructure and the computing services provided to multiple lines-of-business via dedicated computing channels. Although many different approaches may be employed to configure and arrange the technology infrastructure and computing services of an enterprise-wide computing system, the distributed computing system described herein provides common design standards via a common application programming interface (API) which results in modular building blocks that are compatible with one another within and across the computing channels utilized by the lines-of-business of an enterprise. The modular components may be reused and deployed across various computing channels to provide similar functionality to the lines-of-business that respectively utilize those respective computing channels.

Furthermore, the distributed computing system described herein leverages the modular components to achieve several technical advantages. The modular components consumed within the distributed computing system are referred to in this disclosure as computing services. Each computing service may be constructed of one or more "micro service," which represent independently managed pieces of service functionality designed according to the common API. Each computing service may also be constructed of one or more "utility components" which represent reusable and scalable components designed according to the common API.

As used in this description, a "line-of-business" refers to a particular branch of an enterprise that offers a particular product or service. In the context of banking enterprises, examples of lines-of-business include a personal banking line-of-business, a wealth management line-of-business, and a loan management line-of-business. As used in this description, a "computing service" is the smallest modular unit that may be instantiated within a business platform. Multiple computing services may be instantiated for the computing platform of a line-of-business. Computing services include business computing services and technology computing services. As used in this description, a "business computing service" interfaces with end users operating client computing devices and implements the business logic functionality relevant to a line of business. As used in this description, a "technology computing service" provides technical capabilities to business computing services and other technology computing services. Business computing services and technology computing services are also referred to below as "business services" and "technology services" respectively.

The computing services of the distributed computing system may have different levels of accessibility from the client devices associated with the lines-of-business of the enterprise. For convenience, the computing services may be identified as a "shared computing service," a "common computing service," or a "custom computing service." A distributed computing system may thus include shared technology services, shared business services, common technology services, common business services, custom technology services, and custom business services.

As used in this description, a shared computing service refers to a computing service that is accessible by client computing devices across computing channels or other computing services across computing channels. In other words a shared computing service is shared across computing channels. As used in this description, a common computing service refers to a computing service that is instantiated for each of multiple computing channels in order to provide multiple computing channels with the same functionality. In other words, an instance of a common computing service may be respectively launched for multiple computing channels. Separate instances of a common computing service may be employed for reasons related to regulatory governance, operational risk, and system performance. A common computing service is only accessible by client computing devices or other computing services of the computing channel the common computing service is deployed at. As used in this description, a custom computing service refers to one instance of a computing service that is deployed at a single computing channel of a line-of-business to provide functionality unique to that line-of-business. A custom computing service is likewise only accessible by client computing devices or other computing services of the computing channel at which the custom computing service is deployed.

As used in this description, a "computing service type template" refers to a listing of a collection of computing services. Examples of computing service type templates include a custom business service template, a custom technology service template, a common business service template, a common technology service template, a shared business service template, and a shared technology service template. As used in this description, a computing platform template refers to a listing of a collection of computing service type templates. For example, a computing platform template may identify a custom business service template, a common business service template, and a common technology service template.

As used in this description a "server type" refers to a set of host computing devices ("host devices") that host the computing services identified in a computing service type template. A server type may include a single host device that hosts all of the computing services identified in the computing service type template have been launched at. A server type may also include multiple host devices where one host device hosts some of the computing services identified in a computing service type template while another host device hosts other computing services identified in the computing service type template. Examples of server types include a custom business server type that hosts one or more custom business services, a custom technology server type that hosts one or more custom technology services, a common business server type that hosts one or more common business services, a common technology server type that hosts one or more common technology services, a shared business server type that hosts one or more shared business services, and a shared technology server type that hosts one or more shared technology services.

FIG. 1 illustrates a block diagram of at least a portion of a distributed computing system 100 that may be used according to an illustrative embodiment of the disclosure. The distributed computing system 100, in this example, includes an automated deployment device 101 configured to automatically launch computing services at host devices of the distributed computing system based on a computing platform template. The automated deployment device 101 may have a processor 103 for controlling overall operation of the device and its associated components, including RAM 105, ROM 107, input/output (I/O) module 109, and memory 115.

I/O module 109 may include a microphone, keypad, touch screen, and/or stylus through which a user of the automated deployment device 101 may provide input, and may also include one or more of a speaker for providing audio output and a video display device for providing textual, audiovisual and/or graphical output. Software may be stored within memory 115 and/or storage to provide instructions to processor 103 for enabling the automated deployment device 101 to perform various functions associated with iterating through a computing platform template and initiating launch of the computing services identified therein at host devices of the distributed computing system. For example, memory 115 may store software used by the system 101, such as an operating system 117, application programs 119, and an associated database 121. Processor 103 and its associated components may allow the system 101 to run a series of computer-readable instructions the implement this functionality. In this regard, the automated deployment device 101 is a special-purpose computing device programmed with instructions that, when executed, cause the automated deployment device to perform the steps described in further detail below.

The automated deployment device 101 may operate in a networked environment supporting connections to one or more remote computers, such as terminals 141 and 151. The terminals 141 and 151 may also be referred to as client computing devices. The terminals 141 and 151 may be in signal communication with various components of the distributed computing system 100 and may include many or all of the elements described above relative to the automated deployment device 101. The network connections depicted in FIG. 1 include a local area network (LAN) 125 and a wide area network (WAN) 129, but may also include other networks. When used in a LAN networking environment, the automated deployment device 101 may be connected to the LAN 125 through a network interface or adapter 123. When used in a WAN networking environment, the automated deployment device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

The terminals 141 or 151 may include desktop computing devices, laptop computing devices, tablet computing device, palmtop computing devices, cellular telephones, network-enabled gaming machines, network-enabled televisions, and television settop boxes. In addition, the terminals 141 and 151 may include various other components, such as a battery, speaker, and antennas (not shown).

The disclosure is operational with numerous special purpose computer system environments or configurations. Examples of computer systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
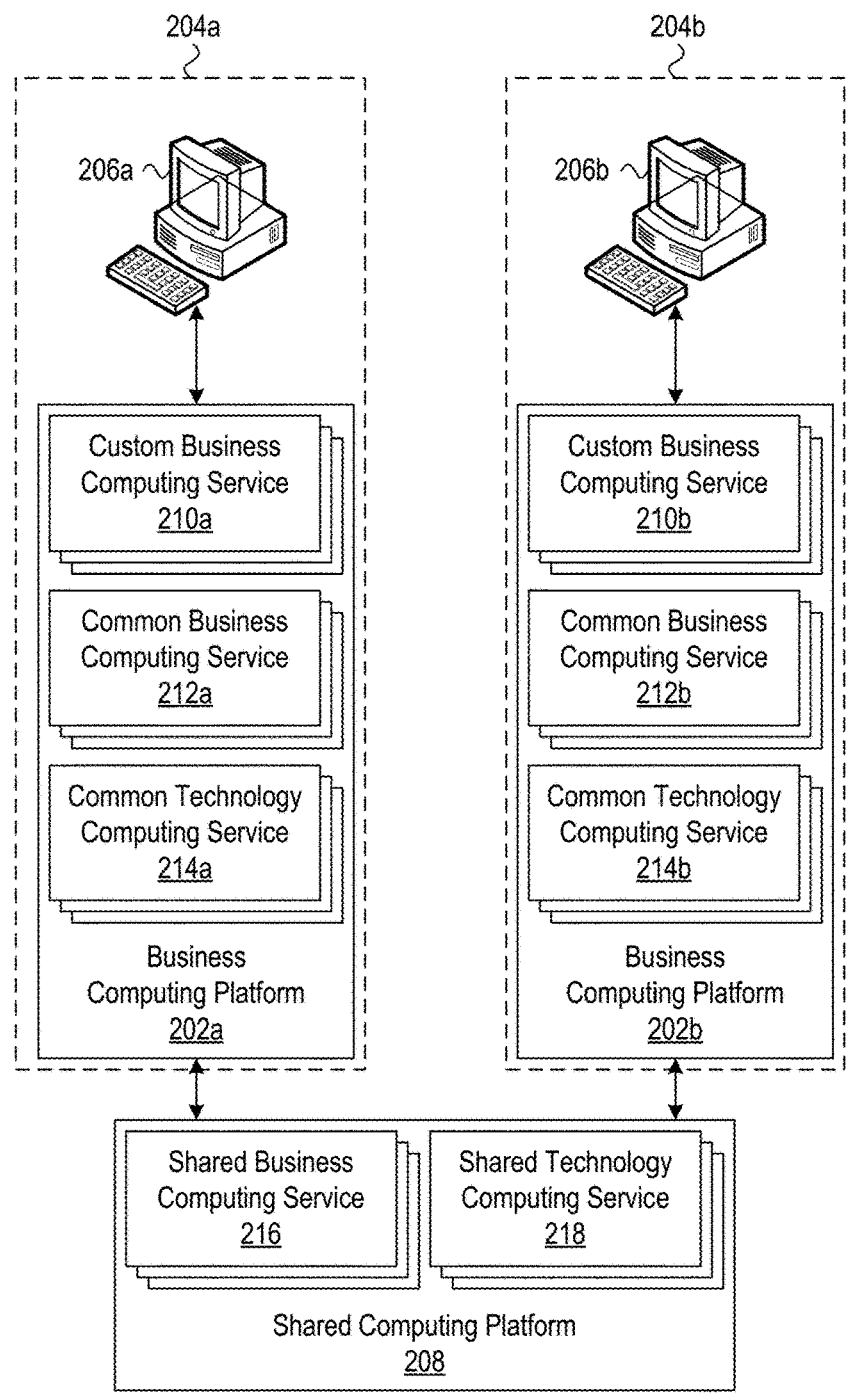
FIG. 2 is an example of an implementation of a distributed computing system in accordance with aspects of the disclosure.

In FIG. 2, an example of an implementation of a distributed computing system 200 in accordance with aspects of the disclosure is shown. In the description set forth below, a set of computing services refers to a collection of one or more computing services. The distributed computing system 200, in this example, includes business computing platforms 202a and 202b for respective computing channels 204a and 204b. The computing channels 204a-b may be respectively associated with one of the lines-of-business of an enterprise. Client computing devices 206a and 206b may access the business computing platforms 202a and 202b respectively. The client computing device 206a-b may also access, via the business computing platforms 202a-b, a shared computing platform 208. The distributed computing system 200 may include one or more of the components described above with reference to the distributed computing system 100 of FIG. 1.

Each business computing platform 202a-b, in this example, respectively includes a set of custom business computing services 210a and 210b. As described above, the custom business services 210a implement functionality unique to the line-of-business associated with the business computing platform 202a, and the custom business services 210b implement functionality unique to the line-of-business associated with the business computing platform 202b. Each business computing platform 202a-b, in this example, also respectively includes a set of common business computing services 212a and 212b as well as a set of common technology computing services 214a and 214b. The business computing platforms 202a-b may include one or more host devices that respectively host the custom business computing services 210a-b, common business computing services 212a-b, and common technology services 214a-b.

Stated differently, the custom business computing services 210a, common business computing services 212a, and common technology computing services 214a are dedicated to the client computing devices 206a of the business computing platform 202a; and the custom business computing services 210b, common business computing services 212b, and common technology computing services 214b are dedicated to the client computing devices 206*b* of the business computing platform 202*b*. Accordingly, in this example distributed computing system 200, the custom business computing services 210*a*, common business computing services 212*a*, and common technology computing services 214*a* are only accessible by client computing devices 206*a* of the business computing platform 202*a*; and the custom business computing services 210*b*, common business computing services 212*b*, and common technology computing services 214*b* are only accessible by client computing devices 206*b* of the business computing platform 202*b*.

As also described above, the common business computing services 212*a-b* and the common technology computing services 214*a-b* are respectively deployed at the business computing platforms 202*a-b* in order to provide similar functionality to each of the business computing platforms. Accordingly, at least one of the common business computing services 212*a* hosted at the business computing platform 202*a* may be an instance of the same common business computing service 214*a* hosted at the business computing platform 202*b*. The same may be true for the common technology computing services 214*a-b*.

The shared computing platform 208, in this example, includes a set of shared business computing services 216 and a set of shared technology computing services 218. The shared business computing services 216 and the shared technology computing services 218 may be shared across the business platforms 202*a-b*. Accordingly, the shared business computing services 216 and the shared technology computing services 218 are accessible by the client computing devices 206*a-b* as well as the custom business computing services 210*a-b*, the common business computing services 212*a-b*, and the common technology computing services 214*a-b*. A distributed computing system may include additional computing channels and corresponding business computing platforms for additional lines-of-business of the enterprise. Each computing channel and corresponding line of business may thus correspond to one of those lines-of-business. As described in further detail below, an automated deployment system may automatically configure new business computing platforms for new lines-of-business using computing platform templates and computing service templates.

Examples of custom business computing services may include: a product enrollment service, an account overview service, and other types of custom services that may be developed by a line-of-business to facilitate the activities of that line-of-business. If a custom business service is determined to have applicability to another line-of-business, then that business service may be deployed at that the business computing platform for that other line of business as a common business service. The common design methodology and common API described herein advantageously ensures that the custom business service of one line-of-business may be instantiated at another line-of-business in a modular fashion and, if necessary, interface with the custom business computing services developed for that other line of business.

Examples of common business services include: trading services; account services; electronic signature services; order entry services; client profile services; account aggregation services; customer relationship management (CRM) services; and other types of business computing services that are relevant to multiple lines-of-business of an enterprise for which a dedicated instance of the service is desired. Examples of shared business services include: payment services; money transfer services; fraud detection services; and other types of business services that may be shared across the business computing platforms of multiple lines-of-business.

Examples of technology services include: user authorization services; user authentication services; session/state management services; real-time analytics services; business process management services; content management services; event processing services; instrumentation and monitoring services; distributed object caching services; edge caching services; rules engine services; data visualization services; auditing services; information protection services; recovery services; social network integration services; vendor integration services; performance and capacity services; client profile services; geolocation services; client device detection services; portfolio lifecycle management services; document management services; online collaboration services; video collaboration services; enterprise capability and service repository services; asset management services; software deployment and distribution services; source control management services; communication bus services; provisioning services; contact services; routing services; business rules management services; encryption/decryption services; and other types of technology services that support a business computing platform of the computing channel of a line-of-business. As described above, one or more of these technology computing services may be launched at a business computing platform as a common technology computing service or at a shared computing platform as a shared computing service.

The business computing platforms 202*a-b* and the shared computing platform 208 may include software platforms, hardware platforms, virtual platforms, or a combination thereof. Software platforms may be one or more of various operating systems, programming environments, or a combination thereof. Further, software platforms may also include support for one or more of various scripted or interpreted languages. Hardware platforms may refer to one or more of various architectures of a computing processor, devices, or systems. A virtual platform may refer to a virtual machine. The business computing platforms 202*a-b* and the shared computing platform 208 may include one or more infrastructure components, for example, databases, application servers, web servers, routers, and so forth.

Figure 3:
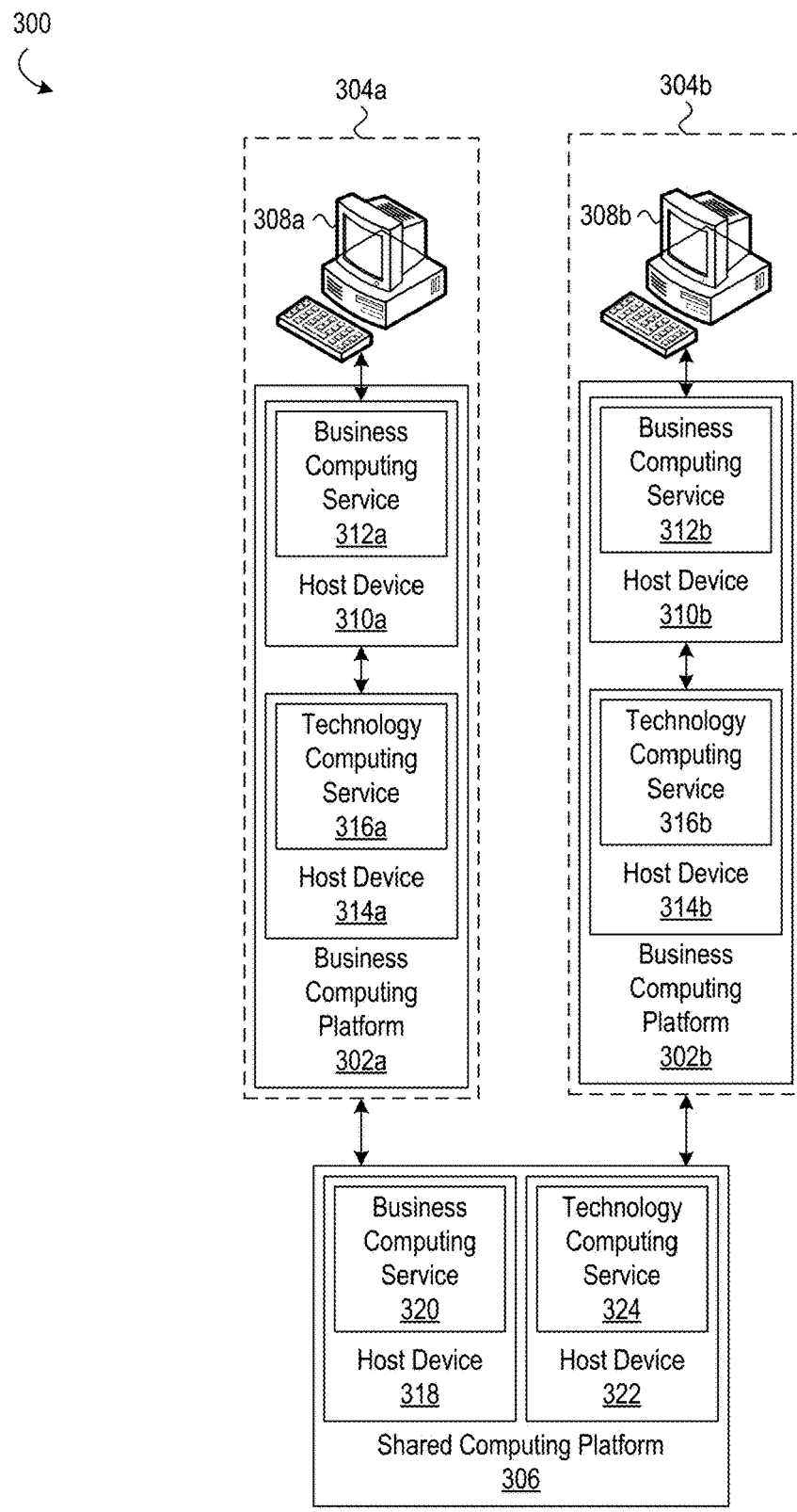
FIG. 3 is another example of an implementation of a distributed computing system in accordance with aspects of the disclosure.

In FIG. 3, another example of an implementation of a distributed computing system 300 in accordance with aspects of the disclosure is shown. The distributed computing system 300 may the same as or at least similar to the distributed computing system 200 described above with reference to FIG. 2. The distributed computing system 300, in this example, similarly includes business platforms 302*a-b* respectively associated with computing channels 304*a-b* and a shared computing platform 306. The computing channels 304*a-b* likewise include client computing devices 308*a-b* are in signal communication with the devices of the business computing platforms 302*a-b* respectively. As seen in FIG. 3, each business computing platform 302*a-b* respectively includes a host device 310*a-b* for hosting business computing services. The host device 310*a* hosts a business computing service 312*a*, and the host device 310*b* likewise hosts a business computing service 312*b*. Each business computing platform 302*a-b*, in this example, also includes a host device 314*a-b* for hosting technology computing services. The host device 314*a* hosts the technology computing service 316*a*, and the host device 314*b* hosts the technology computing service 316*b*. The business computing services 312*a-b* and the technology computing services 316*a-b* respectively hosted at the host devices 310*a-b* and 314*a-b* may be custom services or common services. As also seen in FIG. 3, the shared computing platform 306 includes a host device 318 that hosts a shared business computing service 320 and a shared technology computing service 324.

The client computing devices 308*a-b* are in signal communication with the respective host devices 310*a-b* and 314*a-b* of the business computing platforms 302*a-b*. In addition, the host devices 310*a* and 314*a*, and the computing services 312*a* and 316*a* hosted thereby, are in signal communication with each other as well as the shared computing platform 306 and the host devices 318 and 322 and computing services 320 and 324 respectively hosted thereby. The client devices 308*a-b* may also be in signal communication with the shared computing platform 306, the host devices 318 and 322, and the computing services 320 and 324 either directly or indirectly via the business computing platforms 302*a-b* respectively. Communications may thus be exchanged between the client devices 308*a-b*; the hosting devices 310*a-b*, 314*a-b*, 318, and 324; and the computing services 312*a-b*, 316*a-b*, 320, and 324 during operation of the distributed computing system.

Although the business computing platforms 302*a-b* are illustrated as having individual host devices for hosting business computing services and technology computing services, business computing platforms, in various implementations, may include multiple host devices that host multiple business computing services or technology computing services which may be hosted as custom services or common services. A shared computing platform, in various implementations, may likewise include multiple host devices for respectively hosting multiple shared business or technology computing services.

Figure 4:
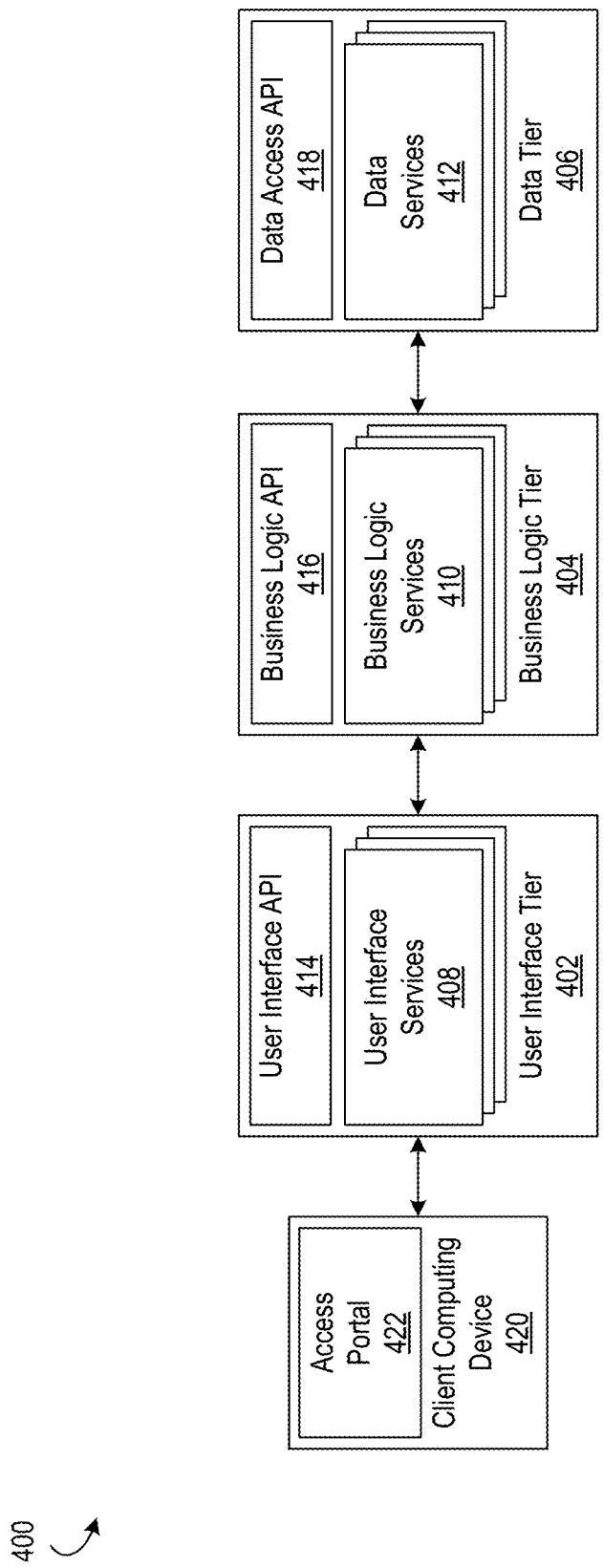
FIG. 4 is a further example of an implementation of a distributed computing system in accordance with aspects of the disclosure.

In FIG. 4, a further example of an implementation of a distributed computing system 400 in accordance with aspects of the present disclosure is shown. The distributed computing system 400 may the same as or at least similar to the distributed computing system 200 described above with reference to FIG. 2 or the distributed computing system 300 described above with reference to FIG. 3.

In a distributed computing system, the business computing services and the technology computing services may be categorized with respect to their role in providing their programmed functionality. Computing services configured to facilitate input and output at a user interface may be categorized, for example, as user interface services. Computing services configured to implement the business logic of a line-of-business may be categorized, for example, as business logic services. Computing services configured to facilitate data storage and retrieval may be categorized as data services.

As seen in FIG. 4, therefore, the distributed computing system 400, in this example, may thus be considered to have three tiers: a user interface tier 402, a business logic tier 404, and a data tier 406. The user interface tier 402 includes a set of user interface services 408 that includes the business computing services and technology computing services that facilitate input and output at a user interface. The business logic tier 404 includes a set of business logic services 410 that includes the business computing services and technology computing services implementing the business logic of one or more lines-of-business. The data tier 406 includes a set of data services 412 that includes the business computing services and technology computing services that facilitate data storage and retrieval.

As noted above, the computing services of the distributed computing systems described herein are designed according to a common API. That API may include portions corresponding to user interface functionality, business logic functionality, and data access functionality. Accordingly, the user interface tier 402, in this example, includes a user interface API 414 corresponding to the portion of the common API that handles user interface functionality. The business logic tier 404, in this example, includes a business logic API corresponding to the portion of the common API that handles business logic functionality. The data tier 406, in this example, includes a data access API 418 corresponding to the portion of the common API that handles data storage and retrieval.

A client computing device 420 may exchange communications with the distributed computing system 400 using an access portal 422 that resides at the client computing device. The access portal 422 may be, for example, a desktop application, a mobile application, or a web browser. Based on the communications exchanged with the access portal 422 of the client computing device, the user interface services 408 may exchange communications with the business logic services 410 which may in turn exchange communications with the data services 412. Messages, instructions, file objects, and other data may be included in the communications exchanged between the client computing device 420, user interface tier 402, business logic tier 404, and data tier 406. Various computing technologies may be employed to implement this exchange of communications including: HTML (HyperText Markup Language); CSS (Cascading Style Sheets); JavaScript; REST (REpresentational STate transfer); SOAP (Simple Object Access Protocol); SQL (Structured Query Language); and other computing technologies suitable for implementing communications between components of a distributed computing network.

FIGS. 5-16 illustrate example workflows of various processes that may be carried out by a distributed computing system in accordance with aspects of this disclosure. The example workflows illustrated show the flow of communications across the user interface tier 402, business logic tier 404, and data tier 406.

Figure 5:
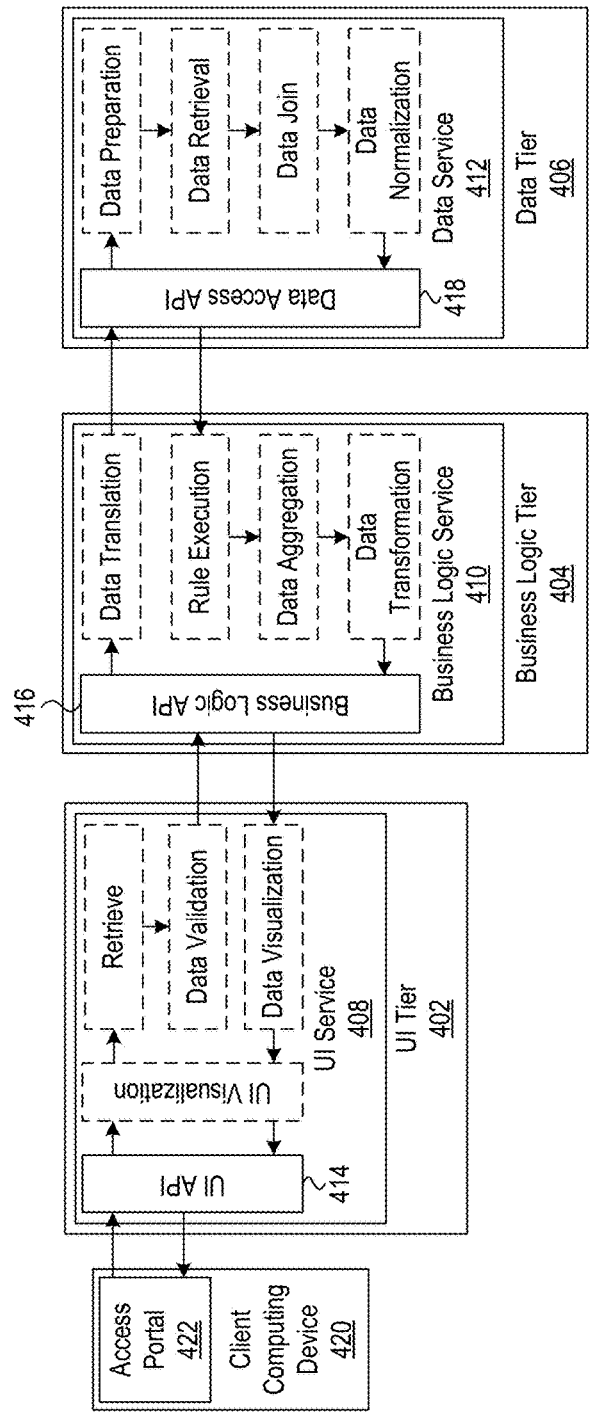
FIG. 5 is an example of a workflow of an inquiry process carried out by a distributed computing system in accordance with aspects of the disclosure.

In FIG. 5 an example of a workflow 500 of an inquiry process carried out by a distributed computing system in accordance with aspects of the disclosure is shown. A distributed computing system may perform this inquiry process to retrieve data or content which may include documents, images, and other types of computer files. The distributed computing system may perform this inquiry process in real-time or near real-time.

Figure 6:
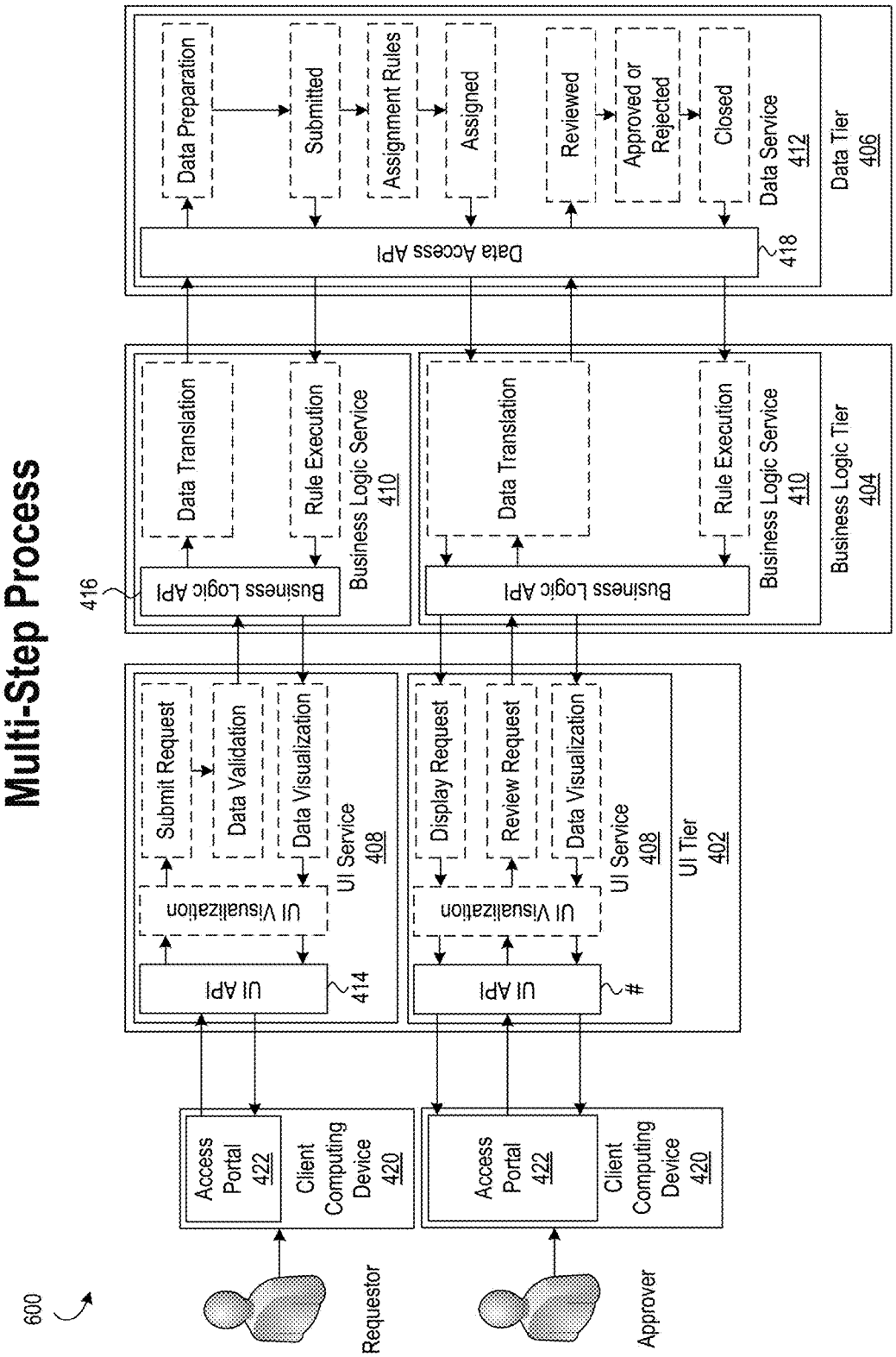
FIG. 6 is an example of a workflow of a multi-step process carried out by a distributed computing system in accordance with aspects of the disclosure.

In FIG. 6 an example of a workflow 600 of a multi-step process carried out by a distributed computing system in accordance with aspects of the disclosure is shown. The multi-step process may require performance of multiple actions by multiple actors to complete the process. The multi-step process illustrated by workflow 600 is an approval process whereby a requestor submits a request that is propagated through the distributed computing system and presented to the approver. In response to receipt of the request, the approver may review the request and submit an authorization or rejection of the request which is propagated back through the distributed computing system to the requestor.

Figure 7:
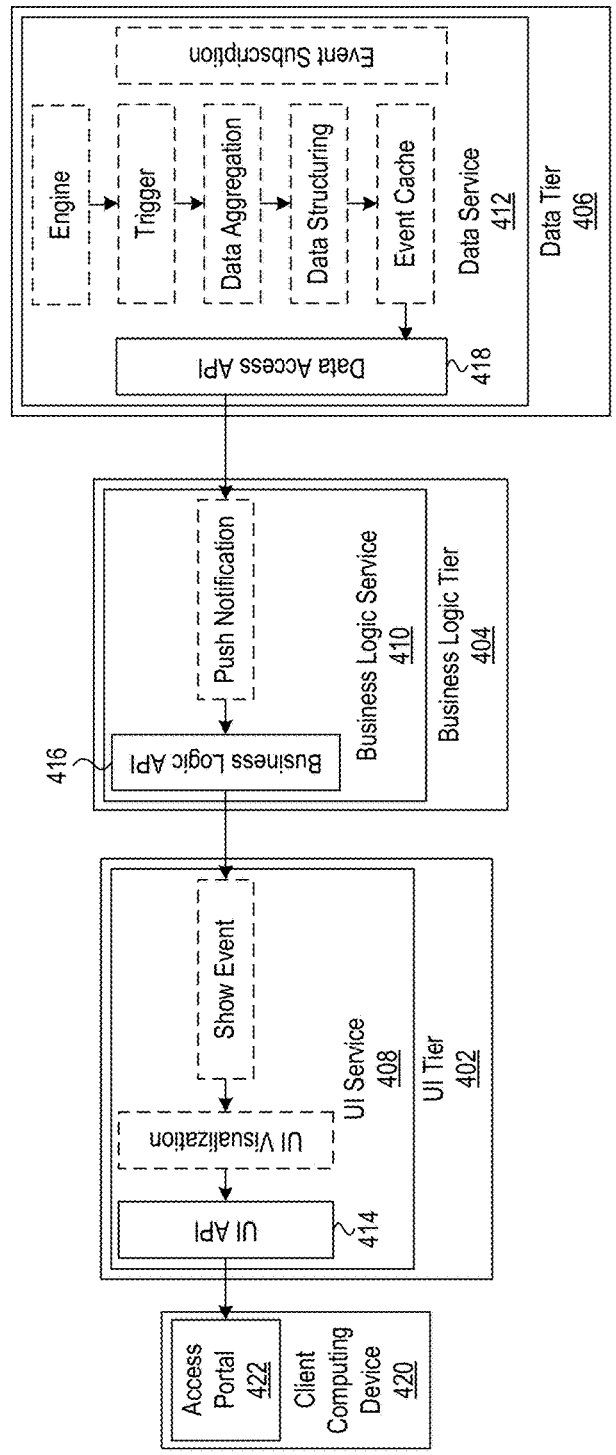
FIG. 7 is an example of a workflow of an event notification process carried out by a distributed computing system in accordance with aspects of the disclosure.

In FIG. 7 an example of a workflow 700 of an event notification process carried out by a distributed computing system in accordance with aspects of the disclosure is shown. An event occurring at the distributed computing system may trigger a notification that is propagated through the distributed computing system for display to a user at a client computing device 420. The notification may identify the event that has occurred and indicate an action to perform responsive to the event.

Figure 8:
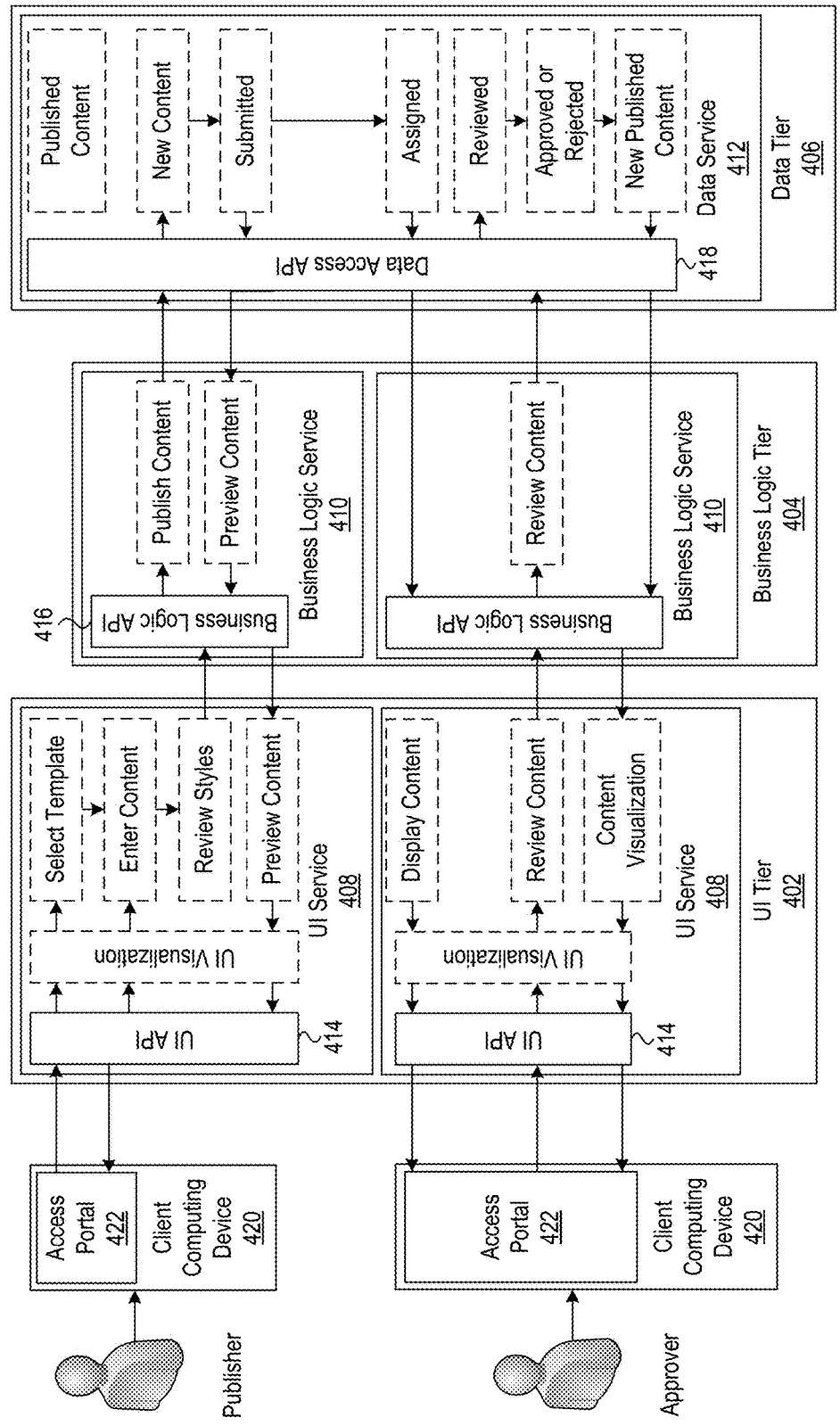
FIG. 8 is an example of a workflow of a content publication process carried out by a distributed computing system in accordance with aspects of the disclosure.

In FIG. 8 an example of a workflow 800 of a content publication process carried out by a distributed computing system in accordance with aspects of the disclosure is shown. The content publication process, in this example, is another multi-step process in which a publisher submits content to be published to the distributed computing system that is propagated to the client computing device 420 of an approver for approval. The approver may submit approval or rejection of the content to be published, and that determination may be propagated through the distributed computing system back to the client computing device 420 of the publisher. The content publication process may also include propagating a content preview to the client computing device 420 of the publisher for review.

Figure 9:
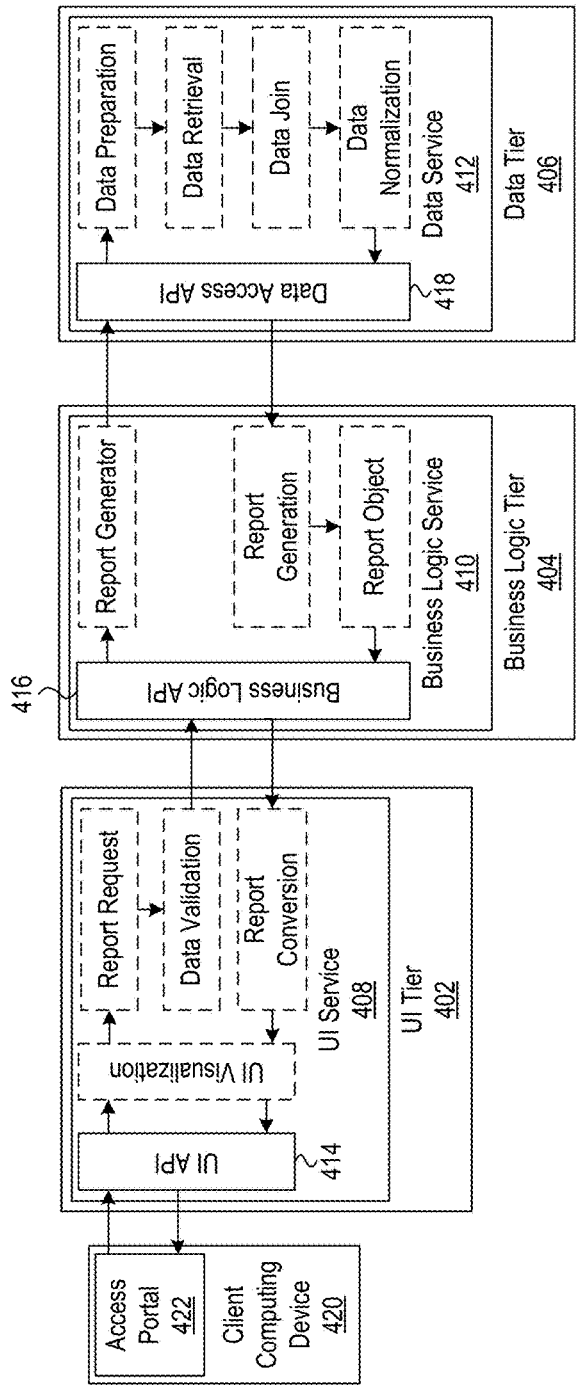
FIG. 9 is an example of a workflow of a report generation process carried out by a distributed computing system in accordance with aspects of the disclosure.

In FIG. 9 an example of a workflow 900 of a report generation process carried out by a distributed computing system in accordance with aspects of the disclosure is shown. Report generation may be triggered automatically at periodic regular intervals or in an ad-hoc fashion in response to receipt of input from a user at the client computing device 420. The distributed computing system may receive a report request, retrieve the data for the requested report, and generate the report using the retrieved data. The distributed computing system may then propagate the generated report back to the client computing device for presentation to the user.

Figure 10:
FIG. 10 is an example of a workflow of a search process carried out by a distributed computing system in accordance with aspects of the disclosure.

In FIG. 10 an example of a workflow 1000 of a search process carried out by a distributed computing system in accordance with aspects of the disclosure is shown. The distributed computing system may receive a search request from the client computing device 420, compile search results based on the search request, and propagate the search results back to the client computing device for presentation to the user. Searches of multiple data sources may be performed simultaneously and in a distributed fashion.

Figure 11:
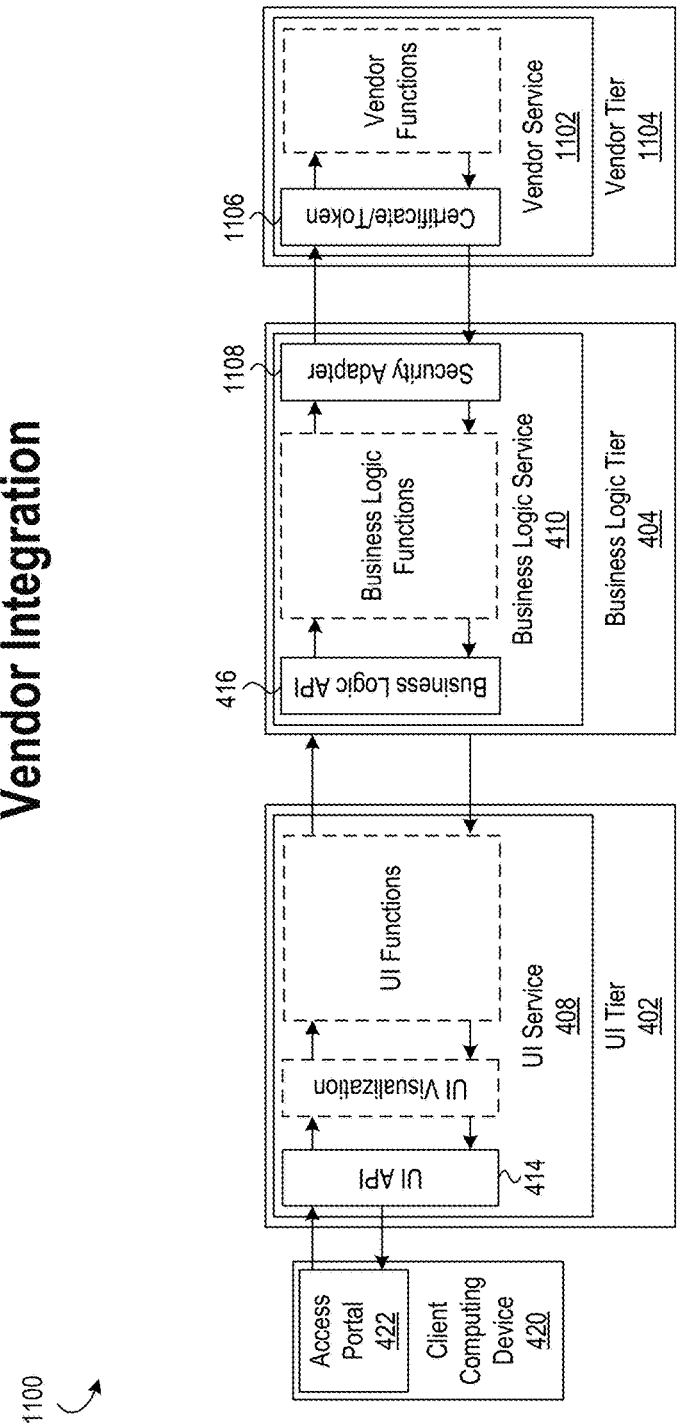
FIG. 11 is an example of a workflow of a vendor integration process carried out by a distributed computing system in accordance with aspects of the disclosure.

In FIG. 11 an example of a workflow 1100 of a vendor integration process carried out by a distributed computing system in accordance with aspects of the disclosure is shown. A vendor service 1102 may be hosted at a host device of a vendor tier 1104 and in signal communication with a business logic service 410 hosted at a host device of the business logic tier 404 of a distributed computing system. The vendor service 1102, in this example, is external to the distributed computing system and associated with a third-party vendor that has been granted access to the distributed computing service. As seen in FIG. 11, the security between the vendor service 1102 and the business logic service is achieved via the exchange of a certificate/token 1106 from the vendor service to a security adapter 1108 of the business logic service 410.

Figure 12:
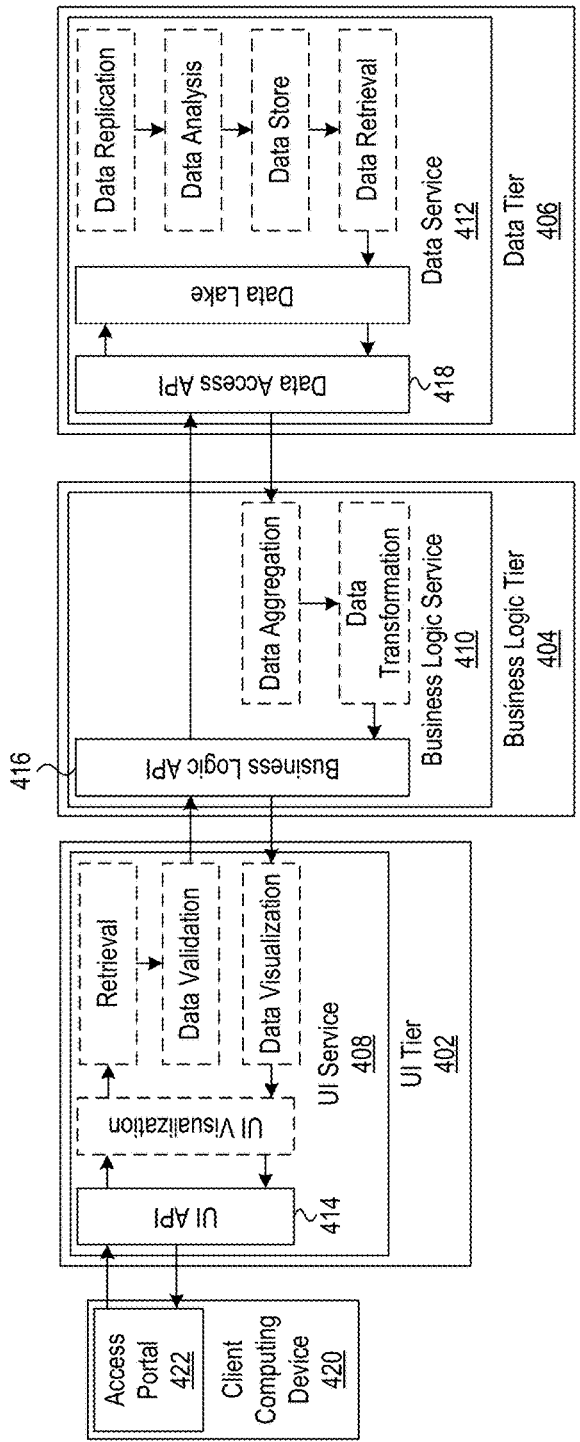
FIG. 12 is an example of a workflow of a discovery analytics process carried out by a distributed computing system in accordance with aspects of the disclosure.

In FIG. 12 an example of a workflow 1200 of a discovery analytics process carried out by a distributed computing system in accordance with aspects of the disclosure is shown. A distributed computing system may implement a discovery analytics process to forecast or investigate operative parameters of the distributed computing system. The distributed computing system may perform a data analysis in response to receipt of a data analytics request received from a client computing device 420 and propagate the analysis results back to the client computing device for presentation to a user. The distributed computing system may also perform a data analysis at regular periodic intervals.

Figure 13:
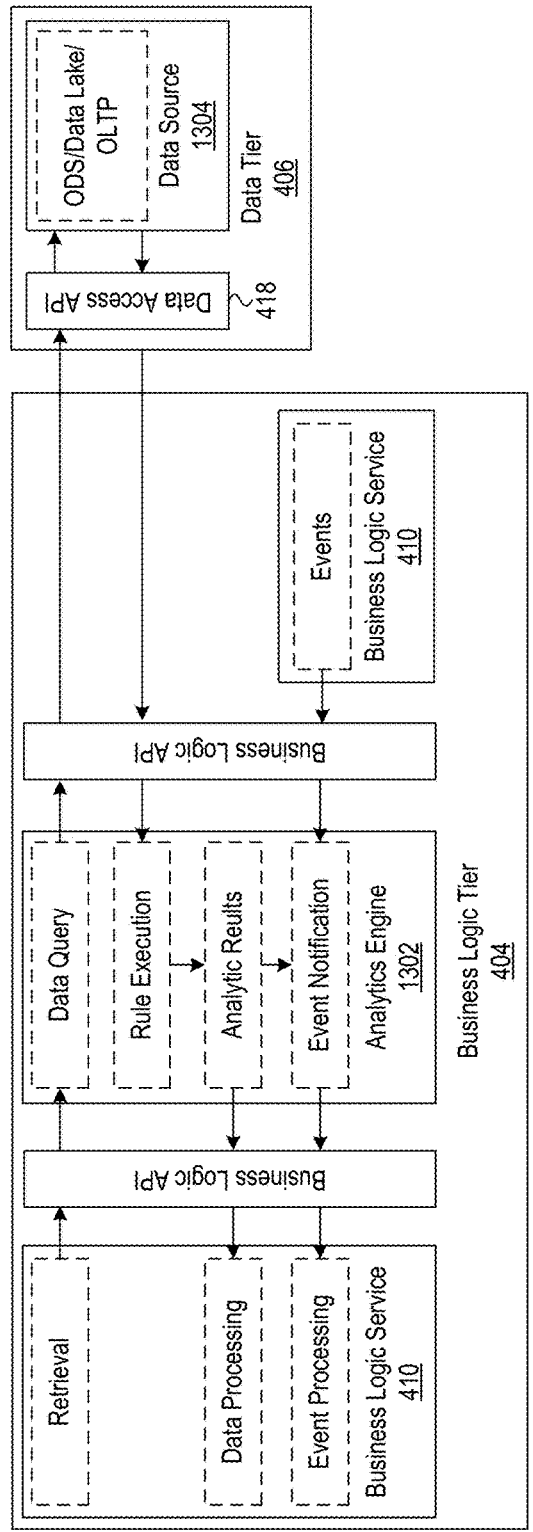
FIG. 13 is an example of a workflow of a near real-time analytics process carried out by a distributed computing system in accordance with aspects of the disclosure.

In FIG. 13 an example of a workflow 1300 of a near real-time analytics process carried out by a distributed computing system in accordance with aspects of the disclosure is shown. The distributed computing system may perform a real-time (or near real-time) data analysis by feeding data generated by various computing services into an analytics engine 1302. The analytics engine 1302 may be one of the business logic services 410 of the business logic tier 404. The analytics engine 1302 may generate events propagated by the distributed computing system to other computing services whereby those computing services initiate various processes in response to receipt of the event. The analytics engine 1302 may also retrieve data from one or more data sources of the data tier 406 of the distributed computing system. The analytics engine 1302 may receive events and data in response to queries submitted by the analytics engine or in the form of communications pushed to the analytics engine.

Figure 14:
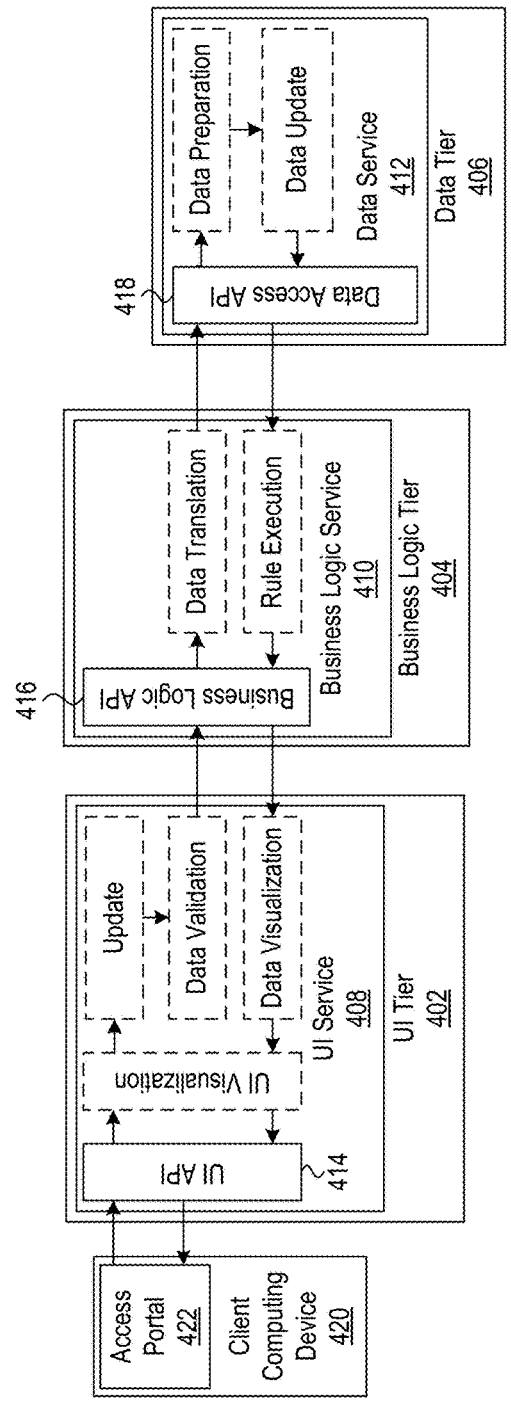
FIG. 14 is an example of a workflow of data source update process carried out by a distributed computing system in accordance with aspects of the disclosure.

In FIG. 14 an example of a workflow 1400 of data source update process carried out by a distributed computing system in accordance with aspects of the disclosure is shown. The distributed computing system may propagate a data update to update the data stored in the data sources of the data tier 406. The update may update data stored in one or more of the data sources.

Figure 15:
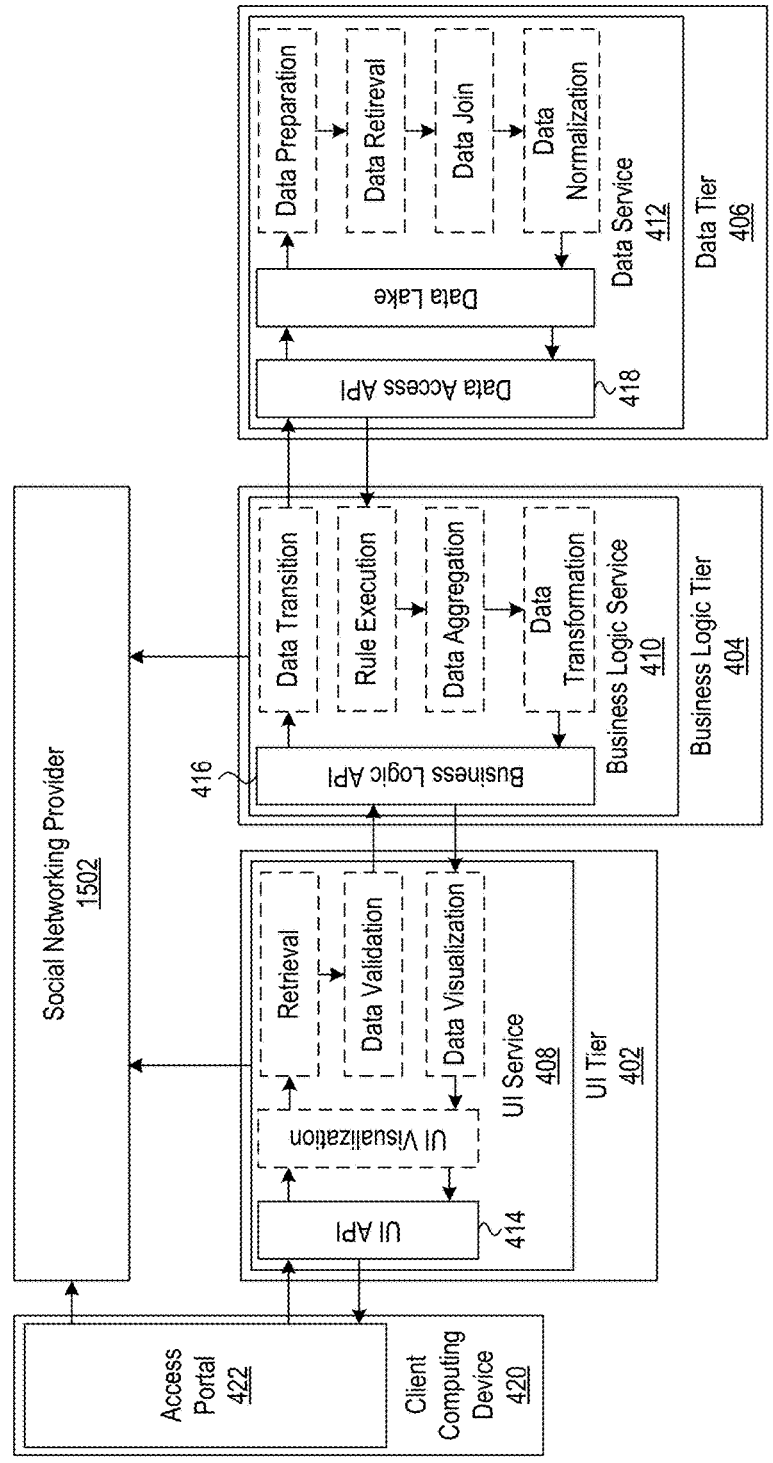
FIG. 15 is an example of a workflow of a social networking process carried out by a distributed computing system in accordance with aspects of the disclosure.

In FIG. 15 an example of a workflow 1500 of a social networking process carried out by a distributed computing system in accordance with aspects of the disclosure is shown. The client computing device 420 as well as the user interface services 408, business logic services 410, and data services 412 may be in signal communication with a social networking provider 1502. The communications with the social networking provider may be employed for sharing content with users of the social network and for managing social networking campaigns associated with the enterprise.

Figure 16:
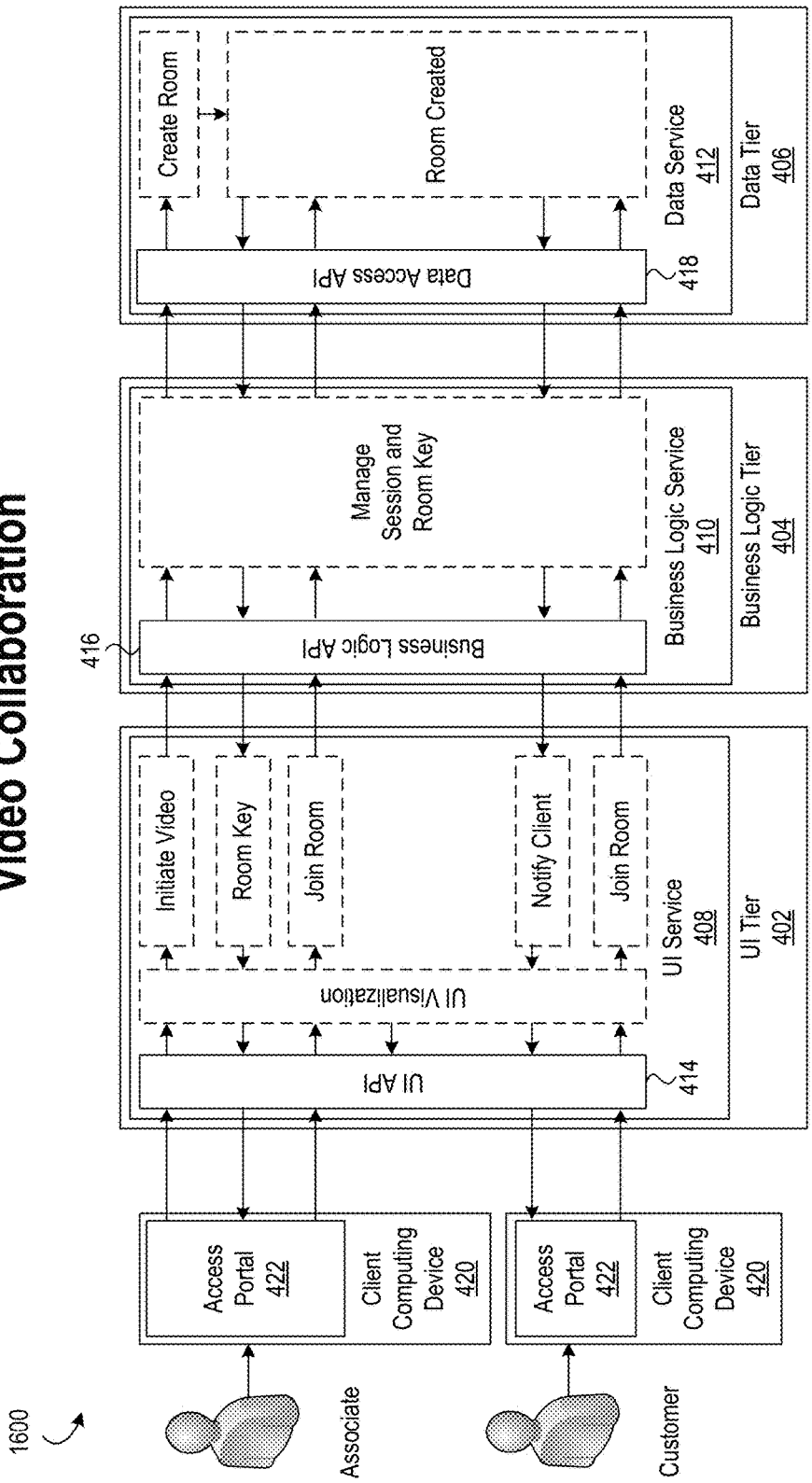
FIG. 16 is an example of a workflow of a video collaboration process carried out by a distributed computing system in accordance with aspects of the disclosure.

In FIG. 16 an example of a workflow 1600 of a video collaboration process carried out by a distributed computing system in accordance with aspects of the disclosure is shown. The distributed computing system may perform a collaboration process to facilitate communications between multiple actors such as, for example, a customer and an associated (i.e., customer service representative). The collaboration may be text-based collaboration in which the distributed computing system propagates text-based messages between the actors. The collaboration may also be video-based in which the distributed computing system propagates video feeds between the actors.

Figure 17:
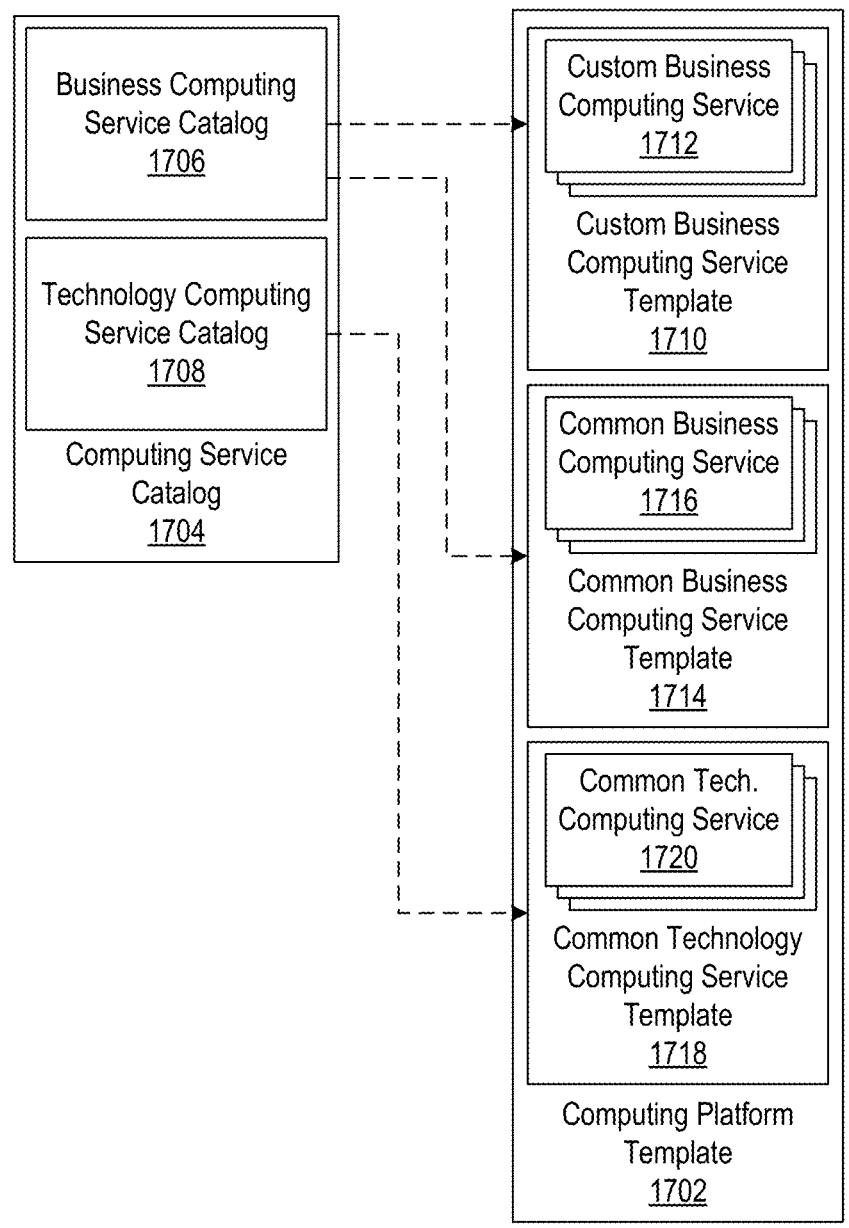
FIG. 17 is an example of an implementation of a computing platform template in accordance with aspects of the disclosure.

In FIG. 17, an example of an implementation of a computing platform template in accordance with aspects of the present disclosure is shown. The computing platform template may be created using a computing service catalog 1704. The computing service catalog, in this example, identifies and describes the computing services available to be deployed at the computing platforms of a distributed computing system. As computing services include both business computing services and technology computing services, the computing service catalog 1704, in this example, includes a business service computing catalog 1706 as well as a technology computing service catalog 1708. The business computing service catalog 1706 may identify and describe the business computing services available to be deployed at the computing platforms of the distributed computing system. The technology computing service catalog 1708 may identify and describe the technology computing services available to be deployed at the computing platforms of the distributed computing system.

A special-purpose computing device, e.g., a computing platform template creation device (not shown), may be programmed with instructions that, when executed, facilitate the creation of the computing platform template 1702. The computing platform template creation device may display the business computing service catalog 1706 and the technology computing service catalog 1708 at a display device. The computing platform template creation device may also receive selection of one or more computing services from the business computing service catalog 1706 and the technology computing service catalog 1708 to include in the computing platform template 1702.

As seen in FIG. 17, the computing platform template 1702, in this example, includes: a custom business computing service template 1710 that identifies a set of custom business computing services 1712; a common business computing service template 1714 that identifies a set of custom business computing services 1716; and a common technology computing service template 1718 that identifies a set of common technology computing services 1720. The computing services to be included in these templates may be selected from the computing service catalogs 1706 and 1708 presented at the computing platform template creation device.

The computing platform template creation device may also facilitate creation of custom business service templates, custom technology service templates, common business service templates, and common technology service templates independent of a computing platform template. The computing service templates may thus be stored separate from the computing platform template. Accordingly, the computing platform template creation device may facilitate creation of a computing platform template by selecting an already existing computing service template to add to the computing platform template. Accordingly the computing platform template creation device may receive selection of one or more computing services to add to a computing platform template as well as selection one or more previously-created computing services templates that identify a set of computing service templates. The computing platform template creation device may thus include the computing services selected and the computing service templates selected in the computing platform template being created.

Figure 18:
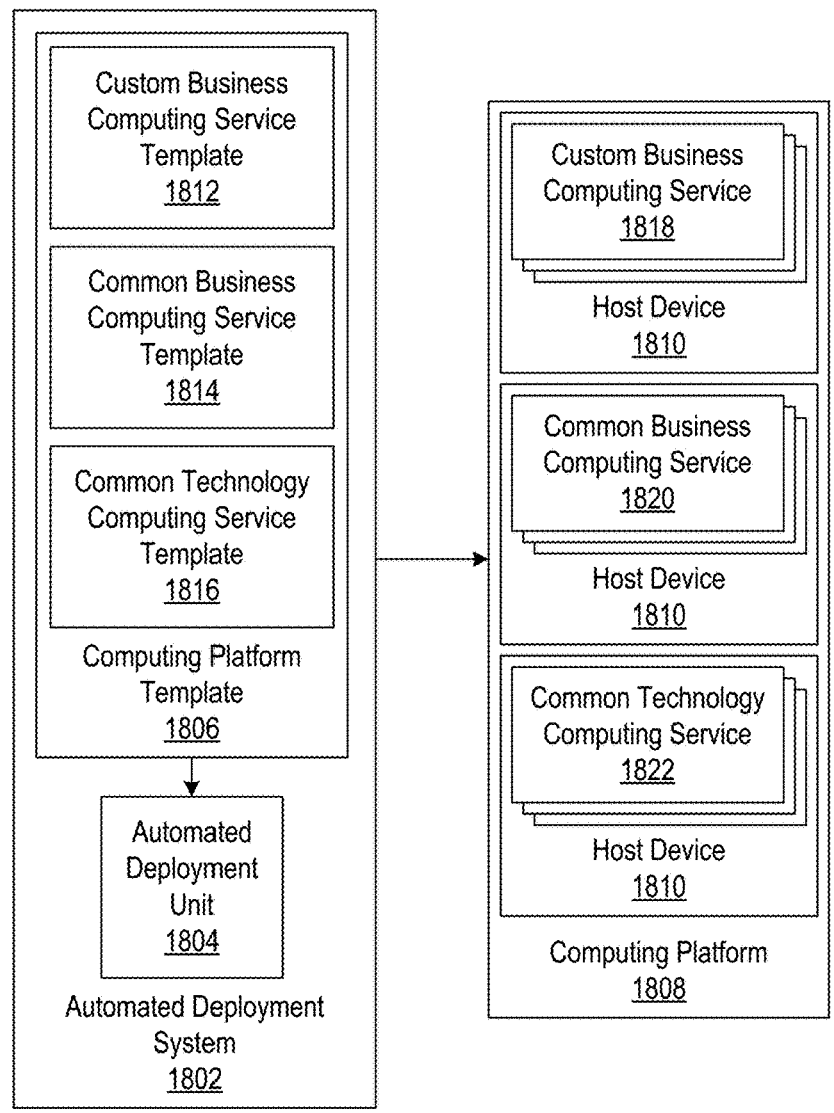
FIG. 18 is an example of an implementation of a distributed computing system having an automated deployment system in accordance with aspects of the disclosure.

In FIG. 18 an example of an implementation of a distributed computing system 1800 having an automated deployment system 1802 in accordance with aspects of the disclosure is shown. The automated deployment system 1802, in this example, includes an automated deployment unit 1804 and a computing platform template 1806 which may reside in a data store (not shown) of the automated deployment system. The automated deployment system 1802 is in signal communication with a computing platform 1808 having multiple hosting devices 1810. The computing platform template 1806, in this example, includes a custom business computing service template 1812, a common business computing service template 1814, and a common technology computing service template 1816. The automated deployment unit 1804 is configured to retrieve the computing platform template 1806 as well as the computing service templates 1812, 1814, and 1816 identified therein. The automated deployment unit 1804 is also configured to respectively iterate over the computing service templates 1812, 1814, and 1816 and initiate launch of each custom business computing service 1818, each common business computing service 1820, and each common technology computing service 1822 identified therein at one of the host devices 1810 of the computing platform 1808. As seen in FIG. 18, different host devices 1810 of the computing platform 1808 may host the various computing services 1818, 1820, and 1822.

The automated deployment system 1802, in this example, may be a special-purpose computing device programmed with instructions that, when executed, automatically initiate launch of various computing services based on a computing platform template as described above. The automated deployment unit 1804 may therefore correspond, in some example embodiments, to a set of instructions embodied as a software program residing at the automated deployment system 1802. In other example implementations, the automated deployment system 1802 is a collection of special-purpose computing devices that are interconnected and in signal communication with each other. In these example implementations, the automated deployment unit 1804 is a special-purpose computing device programmed with a particular set of instructions that, when executed, automatically initiate launch of various computing services based on a computing platform template as described above. Such special-purpose computing devices may be, for example, application servers programmed to perform these functions.

Figure 19:
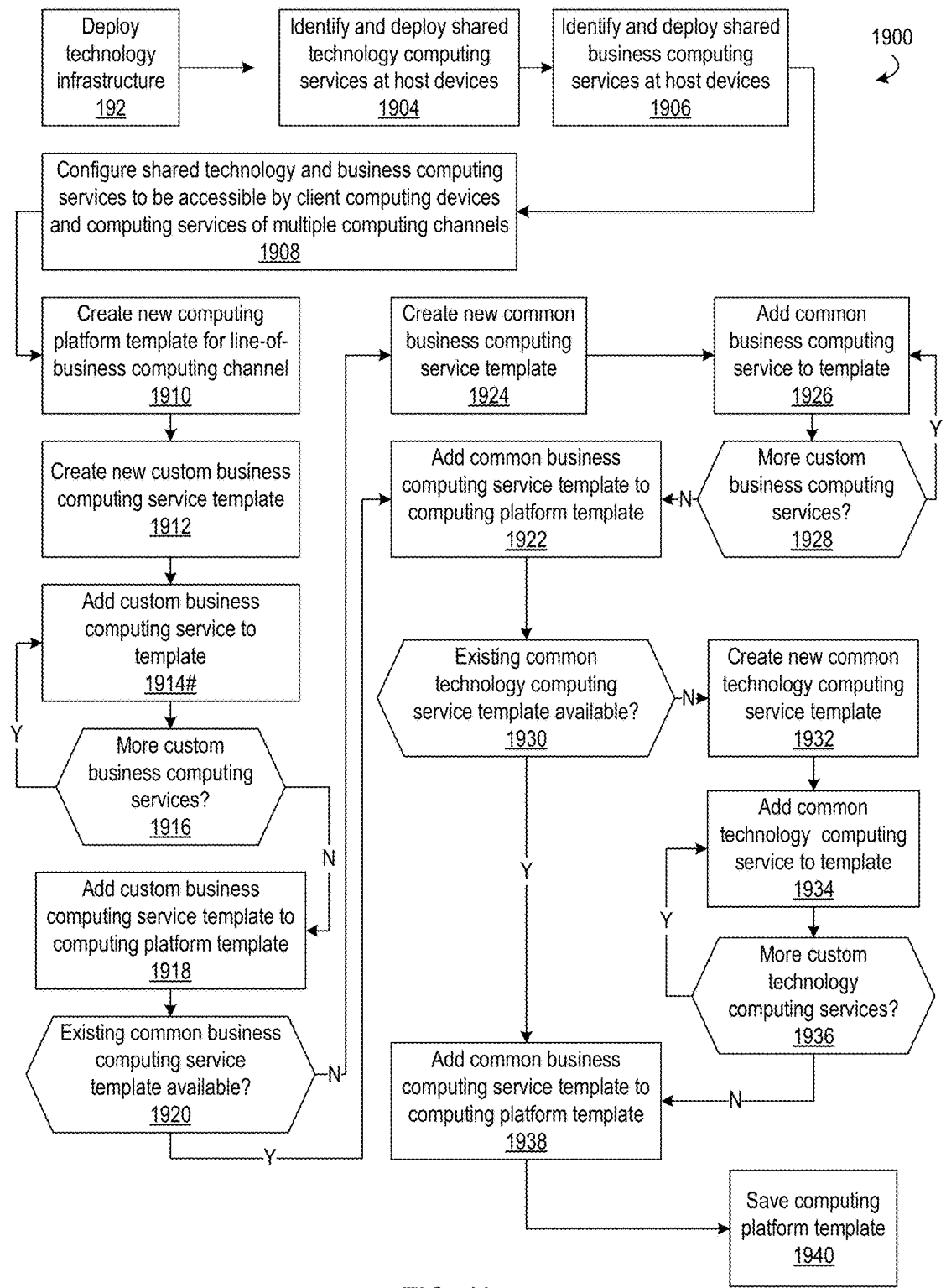
FIG. 19 is a flowchart of example method steps for creating a computing platform template in accordance with aspects of the disclosure.

In FIG. 19 a flowchart 1900 of example method steps for creating a computing platform template in accordance with aspects of the disclosure. The technology infrastructure of a distributed computing system (e.g., application servers, databases, routers, and the like) may be deployed (block 1902). The shared technology computing services utilized by multiple computing channels of the enterprise may be identified and deployed at a shared computing platform of the distributed computing system (block 1904). Similarly the shared business computing services utilized by multiple computing channels of the enterprise may also be identified and deployed at the shared computing platform of the distributed computing system (block 1906). The shared technology computing services and the shared business computing services may be configured to be accessible by client computing devices and computing services of multiple computing channels for the lines-of-business (block 1908).

A new computing platform template may be created (block 1910). A new custom business computing service template for the computing platform template may also be created (block 1912). A custom business computing service may be selected (e.g., from a custom business computing service catalog) and added to the custom business computing service template (block 1914). If there are more custom business computing services to add to the template (block 1916:Y), additional custom business computing services may be selected and added to the custom business computing service template (block 1914). Once the desired custom business computing services have been added to the custom business computing service template (block 1916:N), the custom business computing service template may be added to the computing platform template (block 1918).

If an existing common business service template is available (block 1920:Y), then the previously-created common business service template may be added to the computing platform template (block 1922) if it identifies the desired list of common business computing services. A previously-created common business computing service template may be added to the computing platform template and then modified to add desired business computing services or remove unwanted business computing services. If, however, an existing common business service template is not available (block 1920:N), then a new common business computing service template may be created (block 1924), and a desired common business computing service may be added to the template (block 1926). If there are more common business computing services to add to the template (block 1928:Y), additional common business computing services may be selected and added to the common business computing service template (block 1926). Once the desired common business computing services have been added to the common business computing service template (block 1928:N), the common business computing service template may be added to the computing platform template (block 1922).

If an existing common technology service template is available (block 1930:Y), then the previously-created common technology service template may be added to the computing platform template (block 1938) if it identifies the desired list of common technology computing services. A previously-created common technology computing service template may likewise be added to the computing platform template and then modified to add desired technology computing services or remove unwanted technology computing services. If, however, an existing common technology service template is not available (block 1930:N), then a new common technology computing service template may be created (block 1932), and a desired common technology computing service may be added to the template (block 1934). If there are more common technology computing services to add to the template (block 1936:Y), additional common technology computing services may be selected and added to the common technology computing service template (block 1934). Once the desired common technology computing services have been added to the common technology computing service template (block 1928:N), the common technology computing service template may be added to the computing platform template (block 1938). Steps similar to those set forth above may be performed to add a custom technology service template identifying a set of custom technology services to the computing platform template.

Once the desired computing service templates have been added to the computing platform template, the computing platform template may be saved to a data store (block 1940. One or more of the computing services templates created may also be saved to a data store to leverage during subsequent creation of additional computing platform templates as described above.

Figure 20:
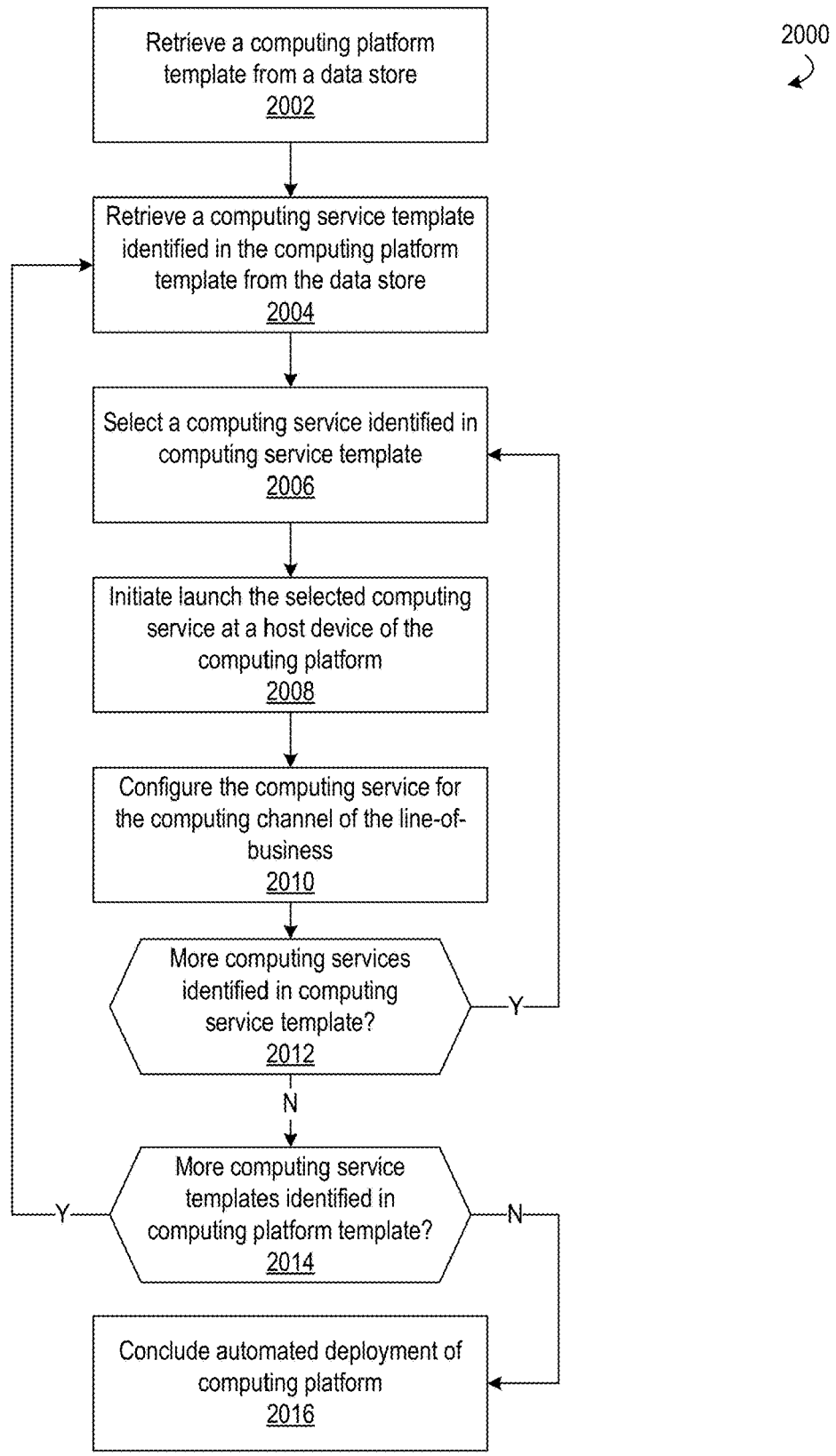
FIG. 20 is a flowchart of example method steps for automatically deploying computing services for a computing channel of a line-of-business in accordance with aspects of the disclosure.

In FIG. 20 a flowchart 2000 of example method steps for automatically deploying computing services for a computing channel of a line-of-business in accordance with aspects of the disclosure. The steps illustrated in FIG. 20 may be performed to deploy the computing services identified in a computing service template such as the computing service template created in FIG. 19.

An automated deployment system may retrieve from a data store a computing platform template (block 2002). The automated deployment system may then retrieve one of the computing service templates identified in the computing platform template from the data store (block 2004). The automated deployment system may select one of the computing services identified in the computing service template (block 2006) and initiate launch of the selected computing service at a host device of the computing platform (block 2008). The automated deployment system may configure the deployed computing service for the computing channel of the line-of-business (block 2010), i.e., such that the deployed computing service is only accessible by client computing devices and computing services of that computing channel.

If the selected computing service template identifies more computing services (block 2012:Y), then automated deployment system may select the next computing service identified in the computing service template (block 2006) and repeat the steps described above to launch the next computing service at a host device of the computing platform. Once each computing service identified in the selected computing template has been launched and configured at a host device of the computing platform, the automated deployment system may determine whether the computing platform template identifies more computing service templates.

If the computing platform template does identify additional computing service templates (block 2014:Y), then the automated deployment system may select the next computing service template identified in the computing platform template (block 2004) and repeat the steps described above to launch and configure each computing service identified in the next selected computing platform template at a host device of the computing platform. Stated differently, the automated deployment system may iterate over each computing service template identified in the computing platform template and initiate launch and configuration of each computing service (e.g., custom business computing services, common business computing services, and common technology computing services) identified in the computing services templates. Once the automated deployment system has processed each computing service template (block 2014:N), the automated deployment system may conclude the automated deployment of computing services (block 2016).

The approach of automatically deploying computing services at a computing platform using computing platform templates and computing service templates provide numerous advantages in designing, configuring, deploying, and maintaining complex distributed computing systems, particularly those including both technical and business aspects. Since the computing services included in the computing channels are modular, the computing services may be quickly added to or removed from a computing channel without disrupting the remainder of the computing platform. As a result, computing platforms for new or existing computing channels may be configured and deployed more efficiently. A modular computing service paradigm also allows for faster development and testing of new computing services for the distributed computing system while ensuring compatibility with existing computing services.

Furthermore the approach of automatically deploying computing services at a computing platform using computing platform templates and computing service templates strikes a balance between reuse and customization. For instance, the computing platform for a new or existing computing channel may be defined using templates, while still allowing the selection of individual common or custom computing services. The availability of templates and a common design standard advantageously allows easy reuse of computing services across computing channels, thus reducing redundant efforts. For example, the computing platform for a new computing channel may be defined by incorporating all or some of the computing services deployed for an existing computing platform. This approach also provides the flexibility of converting computing services for more extensive use (e.g., a custom business computing service may be used as a common business computing service if it is determined to be useful to another line-of-business).

Along with the ease of configuring and deploying new computing platforms, approach described above also enables easy and efficient maintenance of complex distributed systems. For example, by isolating the computing services specific to the computing channel of a line-of-business, a system administrator may be able to monitor and manage the computing services for a specific computing channel, while maintaining uptime and availability of the computing platforms of other computing channels. This is advantageous when updating computing services, replacing hardware components, or investigating and responding to system incidents.

Aspects of the disclosure have been described in terms of illustrative embodiments thereof. Numerous other embodiments, implementations, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A distributed computing system comprising:
   a first host computing device that hosts a first set of computing services accessible only by individual client computing devices associated with a first computing channel;
   a second host computing device that hosts a second set of computing services accessible only by individual client computing devices associated with a second computing channel;
   a third host computing device that hosts a third set of computing services accessible only by individual client computing devices associated with the first computing channel;
   a fourth host computing device that hosts a fourth set of computing services accessible only by individual client computing devices associated with the second computing channel wherein at least one of the computing services of the fourth set of computing services is of the same type as one of the computing services of the third set of computing services; and
   a fifth host computing device that hosts a fifth set of computing services accessible to individual client computing devices associated with the first computing channel and individual client computing devices associated with the second computing channel.

2. The distributed computing system of claim 1 wherein:
   each computing service of the first, second, third, fourth, and fifth set of computing services is configured according to a common application programming interface (API).

3. The distributed computing system of claim 2 wherein:
   each computing service of the third set of computing services is a business computing service configured to receive input from and provide output to individual client computing devices associated with the first computing channel; and
   each computing service of the fourth set of computing services is a business computing service configured to receive input from and provide output to individual client computing devices associated with the second computing channel.

4. The distributed computing system of claim 3 wherein:
   one of the computing services of the third set of computing services or the fourth set of computing services is an e-signature service.

5. The distributed computing system of claim 3 wherein:
   one of the computing services of the third set of computing services or the fourth set of computing services is an order entry service.

6. The distributed computing system of claim 2 wherein:
   each computing service of the third set of computing services and the fourth set of computing services is a technology computing service configured to receive input and provide output to another computing service hosted at a host device of the distributed computing system.

7. The distributed computing system of claim 6 wherein:
   one of the computing services of the third set of computing services of the fourth set of computing services is a user authorization service.

8. The distributed computing system of claim 6 wherein:
   one of the computing services of the third set of computing services of the fourth set of computing services is a video collaboration service.

9. The distributed computing system of claim 2 wherein:
   each computing service of the fifth set of computing services is a business computing service configured to receive input from and provide output to individual client computing devices associated with the first computing channel and individual computing devices associated with the second computing channel.

10. The distributed computing system of claim 2 wherein:
    each computing service of the fifth set of computing services is a technology computing service configured to receive input from and provide output to individual computing services of the third set of computing services and individual computing services of the fourth set of computing services.

11. A method of providing a distributed computing system comprising:
    deploying, at a first host computing device of the distributed computing system, a first set of computing services and configuring the first set of computing services to be accessible only by individual client computing devices associated with a first computing channel;
    deploying, at a second host computing device of the distributed computing system, a second set of computing services and configuring the second set of computing services to be accessible only by individual client computing devices associated with a second computing channel;
    deploying, at a third host computing device of the distributed computing system, a third set of computing services accessible only by individual client computing devices associated with the first computing channel;
    deploying, at a fourth host computing device of the distributed computing system, a fourth set of computing services and configuring the fourth set of computing services to be accessible only by individual client computing devices associated with the second computing channel wherein at least one of the computing services of the fourth set of computing services is of the same type as one of the computing services of the third set of computing services; and
    deploying, at a fifth host computing device of the distributed computing system, a fifth set of computing services and configuring the fifth set of computing services to be accessible to individual client computing devices associated with the first computing channel and individual client computing devices associated with the second computing channel.

12. The method of claim 11, further comprising:
    configuring each computing service of the first, second, third, fourth, and fifth set of computing services according to a common application programming interface (API).

13. The method of claim 12, wherein:

each computing service of the third set of computing services is a business computing service configured to receive input from and provide output to individual client computing devices associated with the first computing channel; and each computing service of the fourth set of computing services is a business computing service configured to receive input from and provide output to individual client computing devices associated with the second computing channel.

14. The method of claim 13, wherein:

one of the computing services of the third set of computing services or the fourth set of computing services is an e-signature service.

15. The method of claim 13, wherein:

one of the computing services of the third set of computing services or the fourth set of computing services is an order entry service.

16. The method of claim 12, wherein:

each computing service of the third set of computing services and the fourth set of computing services is a technology computing service configured to receive input and provide output to another computing service hosted at a host device of the distributed computing system.

17. The method of claim 16, wherein:

one of the computing services of the third set of computing services or the fourth set of computing services is a user authorization service.

18. The method of claim 16, wherein:

one of the computing services of the third set of computing services or the fourth set of computing services is a video collaboration service.

19. The method of claim 12, wherein:

each computing service of the fifth set of computing services is a business computing service configured to receive input from and provide output to individual client computing devices associated with the first computing channel and individual computing devices associated with the second computing channel.

20. The method of claim 12, wherein:

each computing service of the fifth set of computing services is a technology computing service configured to receive input from and provide output to individual computing services of the third set of computing services and individual computing services of the fourth set of computing services.

* * * * *